United States Patent [19]

Harney et al.

[11] 4,024,575
[45] May 17, 1977

[54] CATV SINE WAVE CODING SYSTEM

[75] Inventors: Ralph P. Harney, Wonder Lake, Ill.;
Stanley E. Guif, Madison, Ill.

[73] Assignee: Oak Industries Inc., Crystal Lake, Ill.

[22] Filed: Apr. 30, 1975

[21] Appl. No.: 573,046

Related U.S. Application Data

[63] Continuation-in-part of Ser. No. 451,490, March 15, 1975.

[52] U.S. Cl. .............................. 358/118; 358/121; 179/15 BP
[51] Int. Cl.² ........................................ H04N 1/44
[58] Field of Search .............. 325/308, 62; 178/5.1, 178/DIG. 13; 179/15 BP

[56] References Cited

UNITED STATES PATENTS

| | | | |
|---|---|---|---|
| 2,757,239 | 7/1956 | Patton | 179/15 BP |
| 3,081,376 | 3/1963 | Loughlin et al. | 178/5.1 |
| 3,333,198 | 7/1967 | Mandell et al. | 325/308 |
| 3,619,782 | 11/1971 | Stokes | 178/DIG. 13 |
| 3,729,576 | 4/1973 | Court | 178/5.1 |
| 3,761,914 | 9/1973 | Hardy et al. | 178/DIG. 13 |

*Primary Examiner*—Maynard R. Wilbur
*Assistant Examiner*—S. C. Buczinski
*Attorney, Agent, or Firm*—Kinzer, Plyer, Dorn & McEachran

[57] ABSTRACT

A means for decoding a generally constant frequency sine wave scrambled television signal uses an automatic gain control circuit in a closed loop. The scrambling, applied at the head end of the television system, applies a greater scrambling level to the audio carrier than it does to the video carrier. The unscrambling signal, the detected audio carrier scrambling signal, is combined with the scrambled signal in an amplifier circuit, the output of which is a basic television signal. There is a residual of the scrambling sine wave remaining in the audio carrier output after unscrambling, but little or no residual scrambling remaining on the video carrier. The residual audio carrier scrambling signal is detected and amplified for application as the unscrambling signal.

8 Claims, 5 Drawing Figures

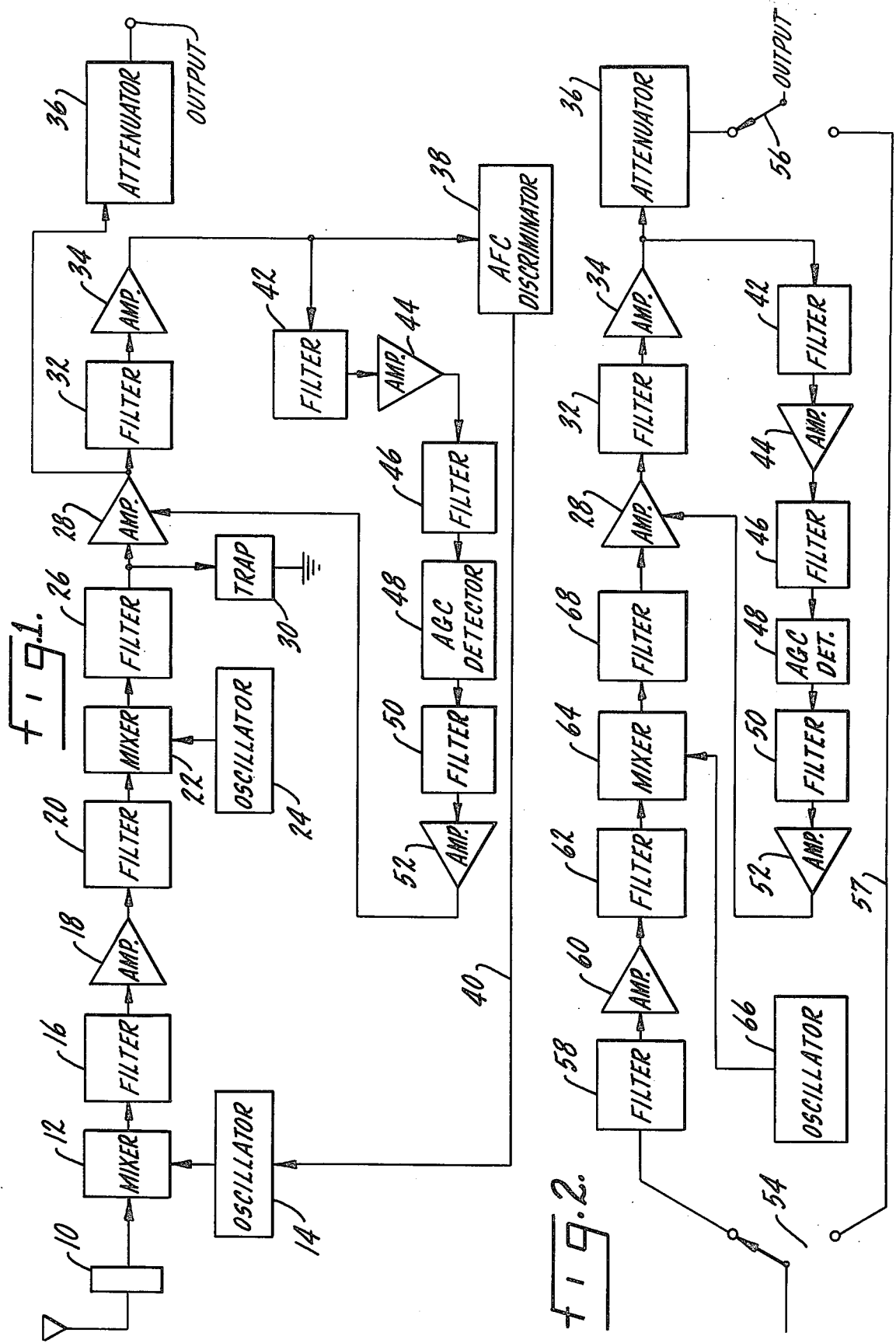

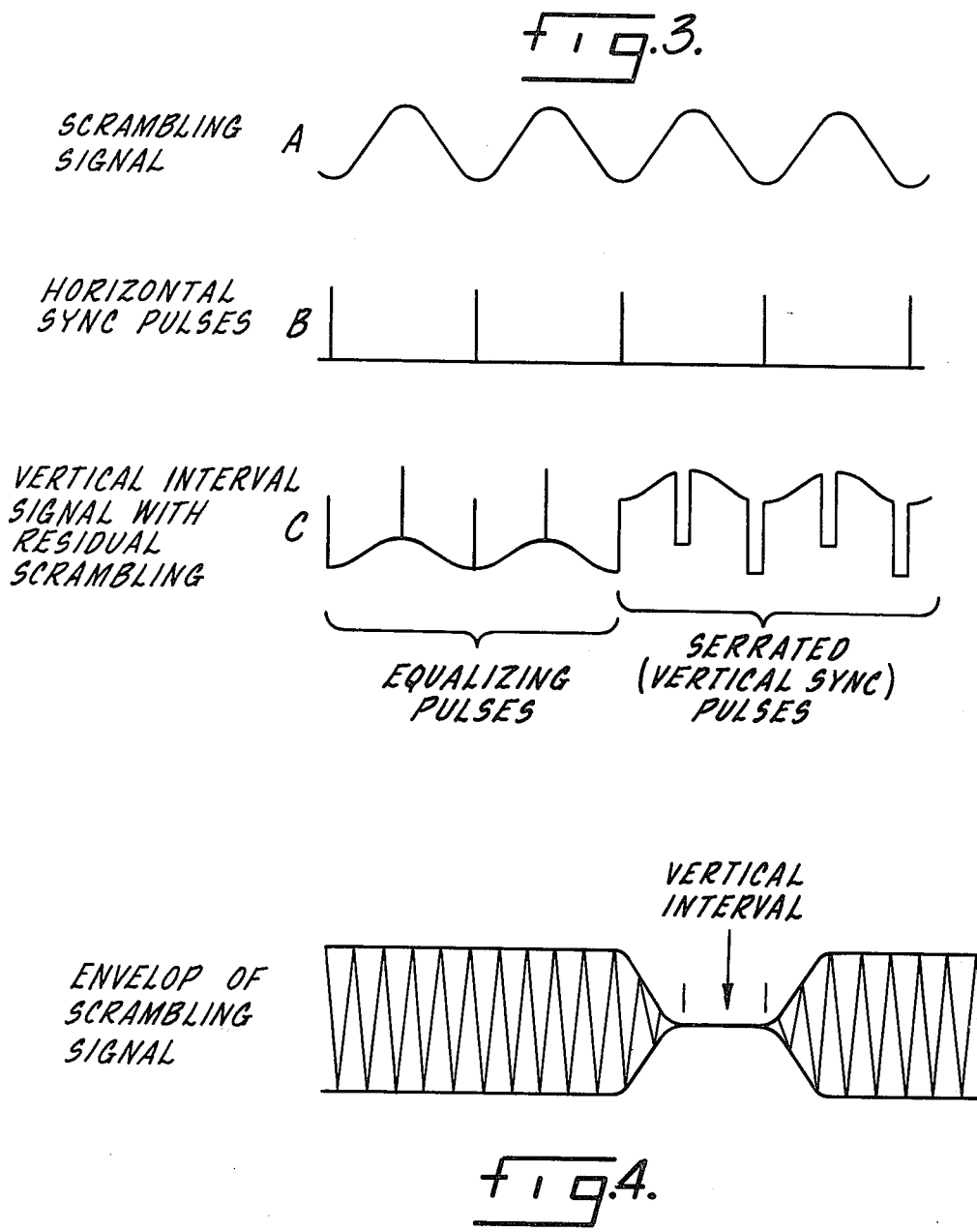

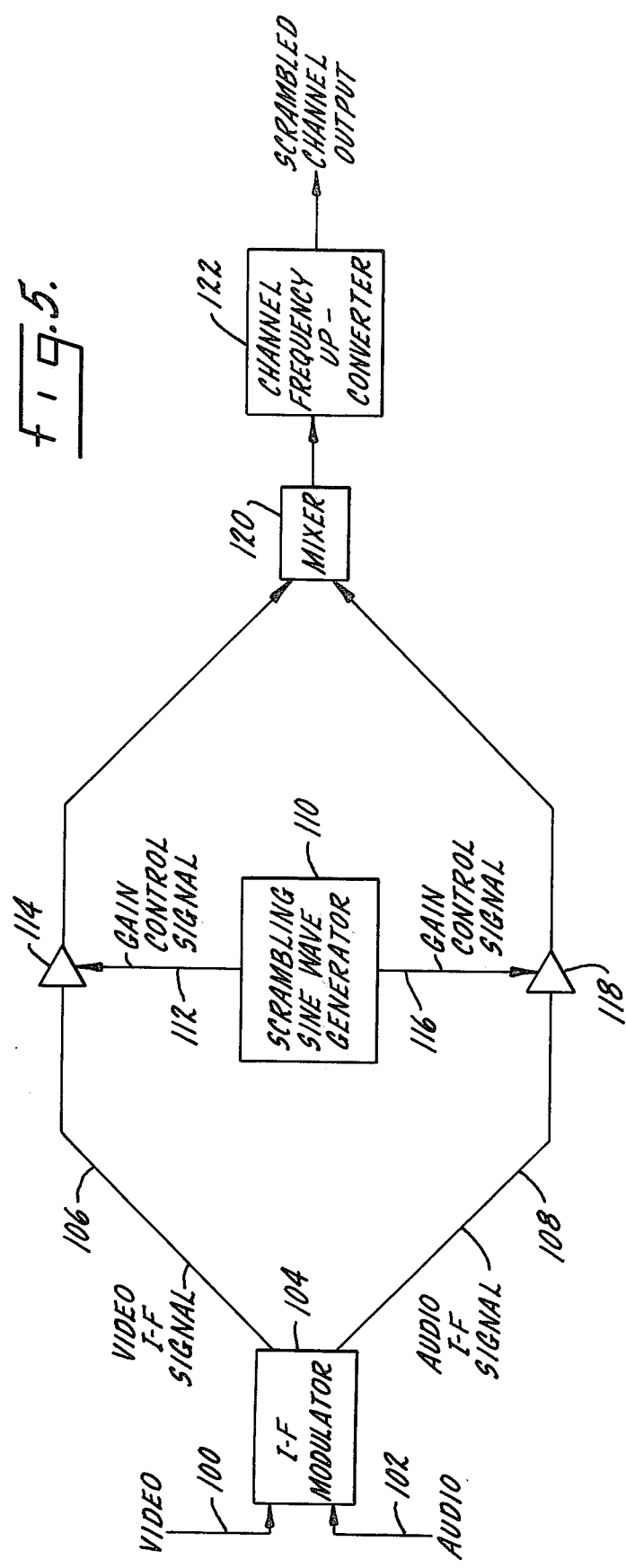

CATV SINE WAVE CODING SYSTEM

This application is a continuation-in-part of my copending application Ser. No. 451,490, filed Mar. 15, 1974.

SUMMARY OF THE INVENTION

This invention relates to television decoding devices and particularly to a simply constructed reliably operable cable television converter including means for decoding a sine wave scrambled television signal.

Another purpose is a cable television converter of the type described in which the decoding means includes an AGC detector in a closed loop with amplifying means in the converter.

Another purpose is a decoding means of the type described utilizing the residual scrambling signal, after decoding, as a means for generating a decoding signal.

Another purpose is a sine wave scrambling system in which the scrambling sine wave applied to the television signal is suppressed during at least a portion of the vertical interval of the television signal.

Another purpose is a sine wave scrambling system in which the scrambling sine wave is applied at a greater level to the audio carrier than to the video carrier.

Another purpose is a subscription TV system using sine wave scrambling in which the audio carrier has a greater scrambling level than the video carrier.

BRIEF DESCRIPTION OF THE DRAWINGS

The invention is illustrated diagrammatically in the following drawings wherein:

FIG. 1 is a block diagram of a cable television converter, including means for unscrambling a coded signal, FIG. 2 is a block diagram of a modified decoding means, FIG. 3 is a diagrammatic illustration of certain wave forms utilized in the coding and decoding system shown and described, FIG. 4 is a wave form diagram showing suppression of the scrambling wave during a portion of the vertical interval, and FIG. 5 is a diagrammatic illustration of the means for applying the scrambling signal at the head end of a cable system.

DESCRIPTION OF THE PREFERRED EMBODIMENT

The present invention relates to a television decoder or unscrambler which is usable in subscription or pay television. In particular, the televised signal is scrambled at the head end or transmitting station by the application of a sine wave as additional modulation to the composite television signal. For example, a scrambling sine wave having a frequency of approximately 15.75 khz is applied directly to the television signal. The sine wave is phase locked to the horizontal sync as shown in FIGS. 3A and 3B. The sine wave modulation has the effect of suppressing the horizontal sync and enhancing the video between horizontal sync pulses. The scrambling sine wave may vary the level of the television signal by approximately 6 DB. Loughlin U.S. Pat. No. 3,081,376 shows a means for applying such a scrambling sine wave to a composite television signal. Court U.S. Pat. No. 3,729,576 also discloses a sine wave scrambling subscription TV system.

Looking specifically at FIG. 5, a video input signal is indicated at 100 and an audio input signal is indicated at 102. Both the video and audio inputs pass to an IF modulator 104 which has a video IF output signal 106 and an audio IF output signal 108. A scrambling sine wave generator is indicated at 110 and has one gain control output signal 112 controlling a video IF signal amplifier 114. A second gain control output signal 116 passes to an audio IF signal amplifier 118. The gain control signal 116 will be at a higher level than that of the gain control signal 112, with the result that the audio IF signal will have a higher level of scrambling modulation than the video IF signal. The audio and video IF signals are combined in a mixer 120 which will pass the audio and video IF signals to a channel frequency up converter 122, the output of which is the composite audio and video carrier scrambled as described for transmission over the cable system.

In FIG. 1, a cable TV converter of the general type shown in Mandell U.S. Pat. No. 3,333,198 includes cable input terminal 10 connected to a first mixer 12. A variable oscillator 14 is connected to the mixer 12 with the output from the mixer passing through a filter 16, an amplifier 18, to a second filter 20. The filter 20 is connected to a second mixer 22 having an oscillator 24, with the output of the second mixer 22 being connected to a filter 26. The components thus far described are conventional and generally shown in the Mandell patent. The input terminal 10 receives a wide spectrum of cable channels, as many as 13 to 26 are conventionally used in CATV systems. The variable oscillator 14 is used to control the particular channel is selected, with oscillator 24 converting the selected channel to a predetermined VHF channel, normally not locally used as a broadcast channel, but one which can be received on a conventional TV receiver. Thus, all channels on the cable can be shown on a particular TV receiver, on a normally unused channel, for example channel 3.

The output from filter 26 is fed to an RF amplifier 28. Between the amplifier 28 and the filter 26 is a trap 30 which normally is used to remove the picture signal of the next higher channel, for example channel 4. An attenuator 36 is connected to amplifier 28 with the output from the attenuator being connected directly to the television receiver. If the particular channel chosen by operation of oscillator 14 is a non-subscription channel, thus one with no scrambling superimposed, the television signal will be readily viewable at the TV receiver on channel 3.

The output from amplifier 28 also passes through a channel 3 filter 32, with the output from filter 32 passing to a second RF amplifier 34. Automatic frequency control is provided by an AFC discriminator 38 which is connected to the output of amplifier 34 and connected by line 40 back to the variable oscillator 14.

The decoding portion of the circuit includes a channel 3 audio carrier filter 42 connected to the output of amplifier 34, with the output of filter 42 being connected to an RF amplifier 44. A second channel 3 audio carrier filter 46 is connected to amplifier 44 with the output from filter 46 being connected to an AGC detector 48. A 15.74 khz filter 50 is connected between the AGC detector 48 and an AGC amplifier 52.

In operation, the composite TV signal varied in amplitude by the applied sine wave, assuming oscillator 14 is set to the subscription channel, will be present at the input of amplifier 28. Filters 42 and 46 provide that only the audio carrier frequency, and related sidebands, are present at the input of AGC detector 48. Since the scrambling signal is present as amplitude modulation on the audio carrier, the scrambling signal will be present at the output of detector 48. Also present is a DC level which is dependent on the signal input level. The output of detector 48 is applied, via filter 50 and amplifier 52, as a gain control signal to amplifier 28. This gain control signal is in anti-phase to any changes of audio carrier output level, from amplifier 28, therefore, any changes in audio carrier output level, from amplifier 28, will be reduced by a factor equal to the loop gain between the output of amplifier 28 and the gain control input of amplifier 28. Thus, the audio carrier output from amplifier 28 contains only a small residual scrambling signal. The video output from amplifier 28 will be simultaneously unscrambled by the gain control signal input. Because the video carrier has a lower level of scrambling signal applied, it will be practically free of scrambling, whereas, there will be a residual or scrambling remaining in the audio output.

In FIG. 2, the same decoding principle is applied without a conventional CATV converter. In this case, ganged switches 54 and 56 either connect the cable input directly to the receiver, by line 57, or to the decoding apparatus as described. The decoding apparatus may include a bandpass filter 58 which will pass the particular channel chosen as the subscription channel. The output of filter 58 is connected to an amplifier 60 and then to a second filter 62. A mixer 64 has one input from filter 62 and a second input from an oscillator 66. For example, if the subscription channel is a letter channel, for example channel C, oscillator 66 will be set such that the output from the mixer is a normally unused channel in the TV set, for example channel 3, as described above. In this connection, quite obviously the invention should not be limited to channel 3, but this is a conventionally used CATV output channel. The output from mixer 64 goes to a filter 68. Filter 68 is connected to RF amplifier 28, with the remaining portions of the decoding circuit being identical with those described in connection with FIG. 1.

In operation, the circuit of FIG. 2, as far as decoding the sine wave scrambled TV signal, functions identically as the circuit of FIG. 1. The principal difference is that there is no conversion of all cable channels to a particular selected normally unused channel in the receiver. Thus, only the subscription channel is converted to that channel, with the remaining channels on the cable being passed directly to the receiver.

In FIG. 3, the scrambling signal sine wave is indicated at the top of the figure, with the television signal horizontal sync pulses shown directly beneath it. The sine wave scrambling signal has the same frequency as the TV signal horizontal sync and has the particular phase relationship shown in FIG. 3. The described scrambling results in suppression of the horizontal sync pulse and enhancement of the video signal which tends to result in a loss of the correct horizontal sync in the television set.

As indicated, the scrambling level of the audio carrer is higher than that of the video carrier. The unscrambling feedback loop will have the effect of attempting to level the audio signal which will effectively level the entire channel. However, as described, there will always be some residual scrambling remaining in the audio output signal and this residual forms the basis for the unscrambling signal. Since the audio carrier is at a higher level than the video scrambling, the end result is to effectively remove the residual scrambling from the video output, leaving a small residual scrambling in the audio output.

Although as much as five percent residual scrambling can be tolerated in the video output, the present system, with a higher level of scrambling on the audio will effectively provide a clean video output signal. The small amount of residual scrambling on the audio output is clearly tolerable in a normal television set.

Although the video carrier will be essentially clean at the receiver input, it is important to insure against interference with the operation of the receiver vertical sync and AGC circuits. During a portion of the vertical interval, sync pulses occur at twice the normal horizontal sync frequency. This takes place during the equalizing pulse intervals and the serrated (vertical sync) pulse interval. See FIG. 3C. The effect of any residual scrambling on the vertical interval is to produce a higher peak level than occurs at any other time during a TV frame. Since both the sync and AGC circuits in a TV set are operated by peak signal levels, this change in peak level occuring during a small portion of a frame may confuse the sync and AGC circuits. The residual scrambling effect may be eliminated at the head end scrambler by suppressing the scrambling signal during at least the nine line interval shown in FIG. 3C.

FIG. 4 shows the envelope of the scrambling signal suitably suppressed during a portion of the vertical interval. Note that the suppression is gradually applied and gradually removed and is only utilized for a portion of the vertical interval, although in some applications it might be for the entire period. Preferably, it is only for that portion of the vertical when the equalizing pulses and vertical sync pulses are transmitted.

Whereas the preferred form of the invention has been shown and described herein, it should be understood that there may be many modifications, substitutions and alterations thereto.

The embodiments of the invention in which an exclusive property or privilege is claimed are defined as follows:

1. In a TV converter having multichannel input capabilities and a single channel output, oscillator means for converting input TV signals to signals usable in a TV receiver, means for decoding a generally constant frequency sine wave scrambled TV signal in which the audio carrier has a greater scrambling level than the scrambling level on the video carrier and in which the scrambling sine wave is suppressed during at least a part of the TV signal vertical interval, and including RF amplifier means having one input of the scrambled TV signal, a second input of a generally constant frequency unscrambling sine wave, and an output of the unscrambled TV signal varied by a residual of said sine wave, a detector connected to the output of said amplifier means for detecting the residual sine wave, audio carrier filter means connected between said RF amplifier and detector, an amplifier connected to said detector for raising the level of the detected residual sine wave, with the output of said amplifier being connected to said RF amplifier means for providing the unscrambling sine wave, and an AFC circuit connected between said RF amplifier output and said oscillator means.

2. The TV converter of claim 1 further characterized in that said RF amplifier means includes two separate RF amplifiers separated by a bandpass filter capable of removing all but one TV channel.

3. The TV converter of claim 1 further characterized in that said audio carrier filter means includes two separate audio carrier filters separated by an amplifier.

4. The TV converter of claim 1 further characterized in that the converter output is taken from the output of said RF amplifier means.

5. Means for decoding a generally constant frequency sine wave scrambled TV signal in which the audio carrier has a greater scrambling level than the scrambling level on the video carrier and in which the scrambling sine wave is suppressed during at least a part of the TV signal vertical interval, including RF amplifier means having one input of the scrambled TV signal, a second input of a generally constant frequency unscrambling sine wave, and an output of the unscrambled TV signal varied by a residual of said sine wave, detector means connected to the output of said RF amplifier means for detecting the residual sine wave, audio carrier filter means connected between said RF amplifier means and detector means, an amplifier connected to said detector means for raising the level of the detected residual sine wave, with the output of said amplifier being connected to said RF amplifier means for providing the unscrambling sine wave.

6. The circuit of claim 5 further characterized in that said RF amplifier means includes a pair of RF amplifiers separated by a single channel filter.

7. A subscription TV system including transmitting means, a communication link and a plurality of receivers,
   means at said transmitting means for applying a generally constant frequency scrambling sine wave to a TV signal, with the audio carrier having a greater amplitude of the scrambling sine wave than the amplitude of the scrambling sine wave on the video carrier,
   means at each receiver for unscrambling the scrambled TV signal including means for detecting the scrambled audio carrier and means for applying said detected audio carrier scrambling signal as the unscrambling signal for the audio and video carrier.

8. The system of claim 7 further characterized by means for suppressing the audio and video scrambling signal during at least a part of the TV signal vertical interval.

* * * * *

UNITED STATES PATENT AND TRADEMARK OFFICE
CERTIFICATE OF CORRECTION

PATENT NO. : 4,024,575

DATED : May 17, 1977

INVENTOR(S) : Ralph P. Harney and Stanley E. Guif

It is certified that error appears in the above-identified patent and that said Letters Patent is hereby corrected as shown below:

On the title page, the Related U.S. Application Data reading "Continuation-in-part of Ser. No. 451,490, March 15, 1975." should read as follows: -- Continuation-in-part of Ser. No. 451,490, filed March 15, 1974. --

Signed and Sealed this

Twenty-second Day of January 1985

[SEAL]

Attest:

DONALD J. QUIGG

Attesting Officer

Acting Commissioner of Patents and Trademarks